United States Patent
Nicholson

(10) Patent No.: US 9,121,305 B2
(45) Date of Patent: Sep. 1, 2015

(54) FLUID CALMING MEMBER

(75) Inventor: Richard Nicholson, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 13/550,127

(22) Filed: Jul. 16, 2012

(65) Prior Publication Data

US 2012/0279597 A1    Nov. 8, 2012

Related U.S. Application Data

(63) Continuation of application No. 11/822,963, filed on Jul. 11, 2007, now abandoned.

(30) Foreign Application Priority Data

Aug. 3, 2006    (GB) .................................. 0615383.7

(51) Int. Cl.
| | |
|---|---|
| F15D 1/02 | (2006.01) |
| F01D 25/16 | (2006.01) |
| B22F 3/105 | (2006.01) |
| B22F 5/00 | (2006.01) |
| F01D 25/12 | (2006.01) |
| B22F 7/00 | (2006.01) |

(52) U.S. Cl.
CPC ............ *F01D 25/164* (2013.01); *B22F 3/1055* (2013.01); *B22F 5/00* (2013.01); *F01D 25/125* (2013.01); *B22F 7/004* (2013.01); *F05D 2230/22* (2013.01)

(58) Field of Classification Search
USPC ................................ 138/39, 42; 384/279, 278
See application file for complete search history.

(56) References Cited

U.S. PATENT DOCUMENTS

| | | | | |
|---|---|---|---|---|
| 2,297,817 | A |  | 10/1942 | Truxell, Jr. et al. |
| 2,517,061 | A |  | 8/1950 | Von Stackelberg |
| 2,576,610 | A |  | 11/1951 | Kunzog |
| 2,625,452 | A | * | 1/1953 | Haller .......................... 384/279 |
| 3,068,016 | A | * | 12/1962 | Dega ............................ 277/406 |
| 3,119,640 | A | * | 1/1964 | Laudig ......................... 428/557 |
| 3,228,674 | A |  | 1/1966 | Ernst |
| 3,374,039 | A | * | 3/1968 | Voorhies ....................... 384/114 |
| 3,645,592 | A | * | 2/1972 | Flandrena ..................... 384/470 |
| 3,672,465 | A |  | 6/1972 | Blatt et al. |
| 3,677,300 | A |  | 7/1972 | King |
| 3,789,880 | A |  | 2/1974 | Armstrong et al. |
| 3,815,379 | A |  | 6/1974 | Scherer et al. |
| 3,823,743 | A |  | 7/1974 | King |
| 4,286,829 | A | * | 9/1981 | Heemskerk ................... 384/469 |

(Continued)

FOREIGN PATENT DOCUMENTS

| | | | |
|---|---|---|---|
| EP | 142264 |  | 9/2004 |
| EP | 1452264 | * | 9/2004 |

(Continued)

OTHER PUBLICATIONS

Merriam-Webster definition of "bearing" from the online website www.merriam-webster.com/dictionary/bearing; Jan. 11, 2015.*

(Continued)

*Primary Examiner* — James Hook
(74) *Attorney, Agent, or Firm* — Oliff PLC

(57) ABSTRACT

A fluid calming member (18, 118, 218) for use in a fluid carrying arrangement (10) is disclosed. The fluid calming member is formed of a material that includes a porous metallic material.

8 Claims, 3 Drawing Sheets

Fig.2A.

(56) References Cited

U.S. PATENT DOCUMENTS

| | | | |
|---|---|---|---|
| 4,316,523 A | | 2/1982 | Boretti |
| 4,365,851 A | * | 12/1982 | Andres et al. ............. 384/465 |
| 4,628,143 A | | 12/1986 | Brotz |
| 5,036,948 A | | 8/1991 | Henn |
| 5,121,819 A | * | 6/1992 | Tecza ....................... 188/306 |
| 5,529,401 A | * | 6/1996 | Gabelli et al. ............. 384/470 |
| 5,980,203 A | * | 11/1999 | Zatorski et al. ........... 415/173.4 |
| 6,024,417 A | * | 2/2000 | Jones et al. ............... 301/124.1 |
| 6,077,038 A | | 6/2000 | Gail et al. ................. 415/229 |
| 2004/0001656 A1 | * | 1/2004 | Yoshimura et al. ........ 384/100 |
| 2004/0126265 A1 | * | 7/2004 | Takiguchi ................. 419/2 |
| 2010/0050580 A1 | * | 3/2010 | Fielding et al. ........... 55/476 |
| 2010/0071793 A1 | | 3/2010 | Warnica et al. |
| 2010/0202715 A1 | * | 8/2010 | Hirade et al. ............. 384/107 |
| 2010/0217039 A1 | * | 8/2010 | Hassan et al. ............. 562/519 |
| 2010/0316317 A1 | * | 12/2010 | Feldmeier ................. 384/469 |

FOREIGN PATENT DOCUMENTS

| | | |
|---|---|---|
| GB | 710292 A | 6/1954 |
| GB | 1 490 270 A | 10/1977 |
| JP | A-2004-324594 | 11/2004 |

OTHER PUBLICATIONS

Oct. 7, 2013 European Search Report issued in European Application No. EP 07 25 2762.

* cited by examiner

FLUID CALMING MEMBER

This is a continuation of U.S. patent application Ser. No. 11/822,963, filed on Jul. 11, 2007, the disclosure of which is hereby incorporated by reference herein.

This invention relates to fluid calming members. More particularly, but not exclusively, the invention relates to fluid calming members in fluid chambers in gas turbine engines. This invention may also relate to fluid chambers. This invention may relate to processes for forming fluid calming members.

Embodiments of the invention relate to fluid calming formations such as baffles and shrouds which are used in gas turbine engines to control fluid recirculation, thereby reducing heat generation. A disadvantage of known formations is that they can create splashing of the fluid thereby reducing their efficiency in reducing heat generation.

According to one aspect of this invention, there is provided a fluid calming member for use in a fluid carrying arrangement, wherein the fluid calming member comprises a porous metallic material.

According to another aspect of this invention, there is provided a fluid carrying arrangement comprising a wall defining a space for a fluid, and a fluid calming member in the space, wherein the fluid calming member comprises a porous metallic material.

The phrase "fluid carrying arrangement" as used herein refers to any arrangement capable of containing a fluid, or allowing a fluid to flow therethrough.

The fluid carrying arrangement may comprise a fluid chamber. The fluid calming member may be formed of a sintered metallic material, and may be formed by a solid free form fabrication process, which may comprise selective melting or sintering, such as selective laser or electron melting or sintering.

The fluid calming member may comprise an inner wall member mounted on the fluid carrying arrangement wall. Alternatively, the fluid calming member may comprise a baffle. Alternatively, the fluid calming member may comprise a shroud. The fluid carrying arrangement may have a plurality of fluid calming members.

The fluid calming member may be formed of a metal foam material. The fluid calming member may comprise substantially non-porous regions to allow the fluid calming member to be secured within the space. Lug portions may be provided on the wall of the fluid carrying arrangement at which the fluid calming member can be secured. The lug portions may be arranged on the wall to be in register with the substantially non-porous regions when the inner wall member is secured to the chamber wall.

According to a further aspect of this invention there is provided a method of forming a fluid calming member, comprising providing a powder of a metallic material and processing the powder into a porous material to form the fluid calming member.

The step of processing the powder may comprise solid freeform fabrication. The step of processing the powder may comprise sintering the material to provide the fluid calming member formed of the porous material. The step of processing the powder may comprise selective laser or electron beam melting or sintering.

The method may include forming substantially non-porous regions in the fluid calming member, at which the fluid calming member can be secured to a chamber wall of a fluid chamber.

According to another aspect of this invention there is provided a fluid carrying arrangement comprising a first part and a second part in the first part wherein at least one of the first and second parts is adapted to carry a fluid, and at least one of the first and second parts is formed by a solid free form fabrication process.

According to another aspect of this invention, there is provided a method of forming fluid carrying arrangement, comprising providing a first part and a second part in the first part, wherein at least one of the first and second part can to carry a fluid, and the method comprises forming at least one of the first and second parts by a solid free form fabrication process.

The solid free form fabrication process may comprise a selective melting or sintering process, such as selective laser or electron melting or sintering.

At least one of the first and second parts may comprise a porous metallic material. The part comprising the porous metallic material may be formed by the solid free form fabrication process.

Embodiments of the invention will now be described by way of example only, with reference to the accompanying drawings, in which.

Figure 1:
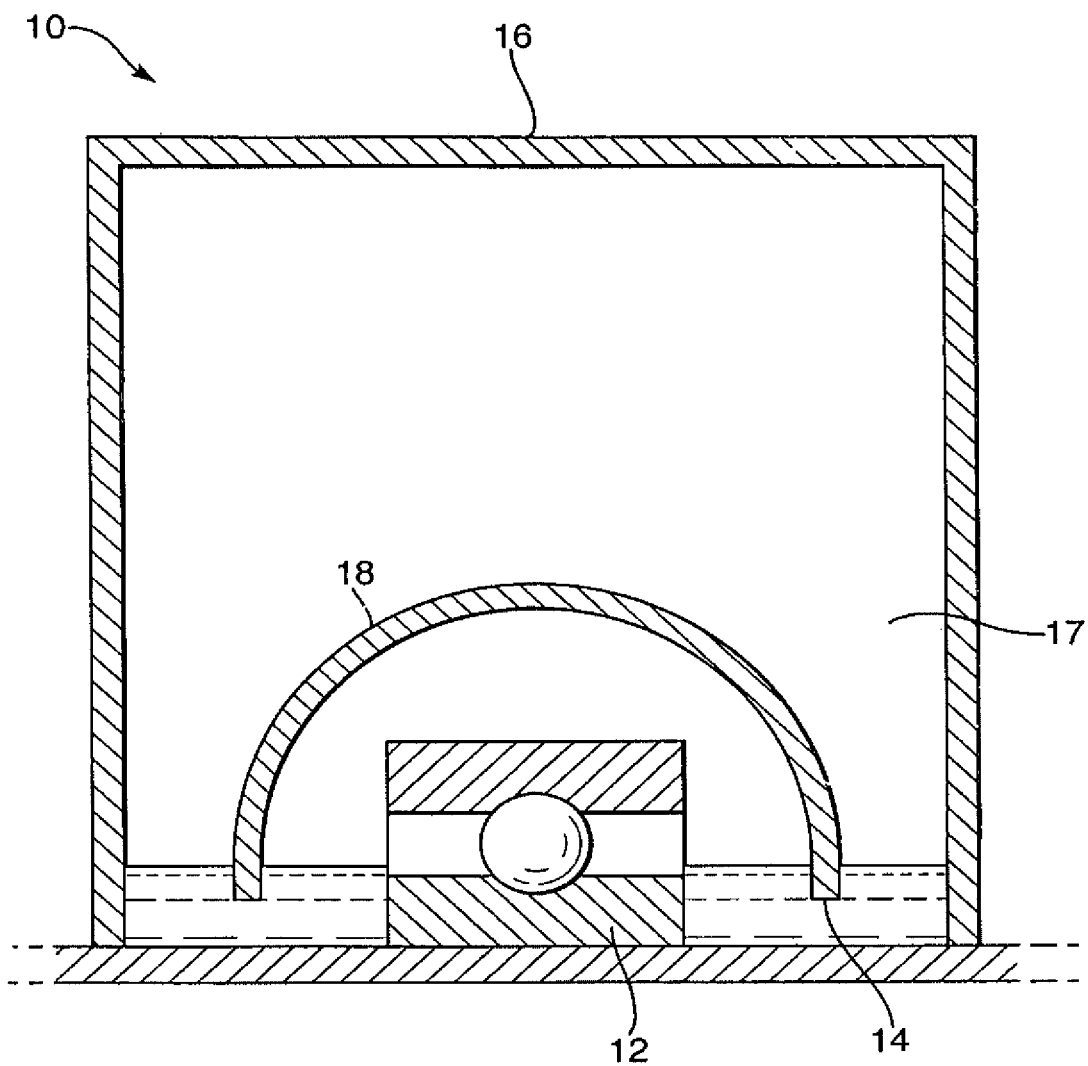
FIG. 1 is a diagrammatic view of a fluid chamber.

Referring to the drawings, FIG. 1 is a diagrammatic view of a fluid chamber 10. In the embodiment shown in FIG. 1, the fluid chamber 10 is a bearing housing in which a bearing 12 is housed. However, it will be appreciated that the fluid chamber 10 could be any other suitable chamber for containing a fluid 14, or for allowing a fluid 14 to flow therethrough, such as a conduit or a chamber for a gear coupling, bolt sequence or any fluid source of windage element. The fluid flowing through or contained in the chamber 10 could be oil or any other suitable fluid.

In the embodiment shown in FIG. 1, the chamber 10 comprises a chamber wall 16 defining a space 17. A fluid calming member in the form of a shroud 18 surrounding the bearing 12 The shroud 18 is formed of a porous metallic material, such as titanium, and can be a metal foam material or a sintered material formed by a solid free form fabrication process, such as selective laser melting or sintering (see below).

Figure 2:
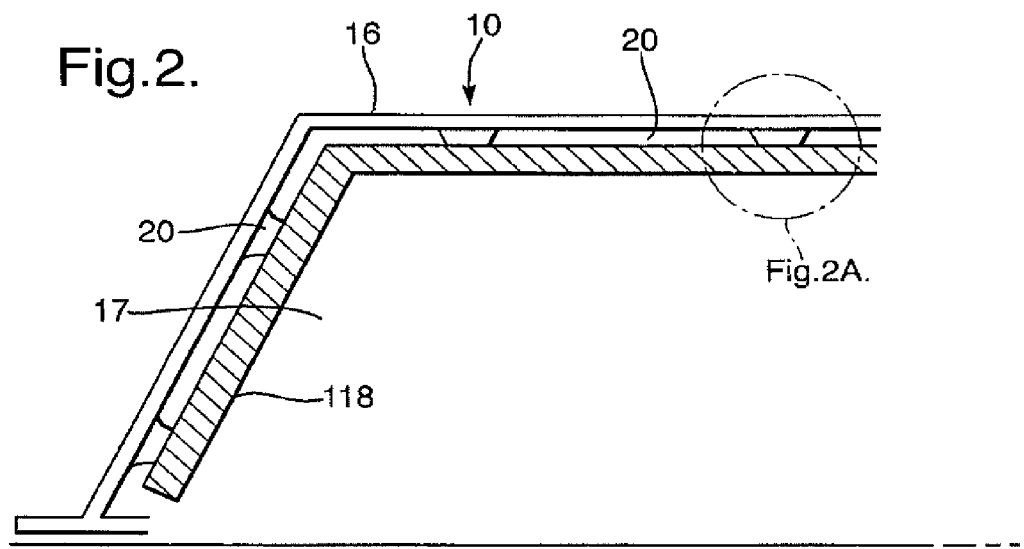
FIG. 2 is a diagrammatic view of a region of the chamber wall.

Referring to FIG. 2, there is shown a further embodiment, similar to that shown in FIG. 1, in which a fluid calming member in the form of a wall member 118 is secured to the chamber wall 16 by lugs 20. The inner wall member 118 defines with the chamber wall 16 a drain zone 22 in which the rate of flow of fluid 14 is greatly reduced, thereby reducing heat absorption by the fluid 14. The porous nature of the fluid calming member 18 allows fluid to percolate therethrough to the drain zone 22 and to flow through the drain zone at a reduced velocity, and minimise re-entrainment into the main chamber.

Figure 2A:
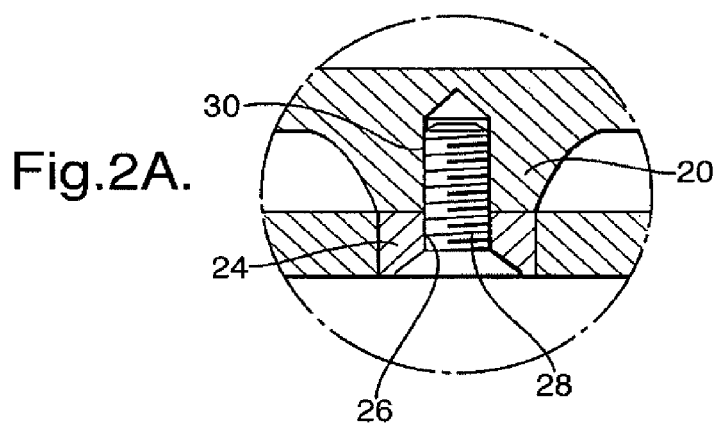
FIG. 2A is a close up of the region marked A in FIG. 2.

The region marked A in FIG. 2 is shown in close up in FIG. 2A and it can be seen that the inner wall member 118 is formed of a porous metallic material such as titanium and may be formed by selective laser melting or sintering, as mentioned above.

The inner wall member 118 also has a plurality of substantially non-porous regions 24 which define countersunk apertures 26 for receiving a countersunk bolt 28. The non-porous regions 24 are arranged within the fluid calming member 18 such that when the fluid calming member 118 is mounted on the chamber wall 16, the non-porous region 24 are in register with the lugs 20. As can be seen from FIG. 2A, the lugs 20 define a threaded recess in to which the countersunk bolt 28 can be threadably received thereby securing the fluid calming member 18 to the chamber wall 16. The countersunk bolt could be a conventional bolt or rivet or the fastening means.

Figure 3:
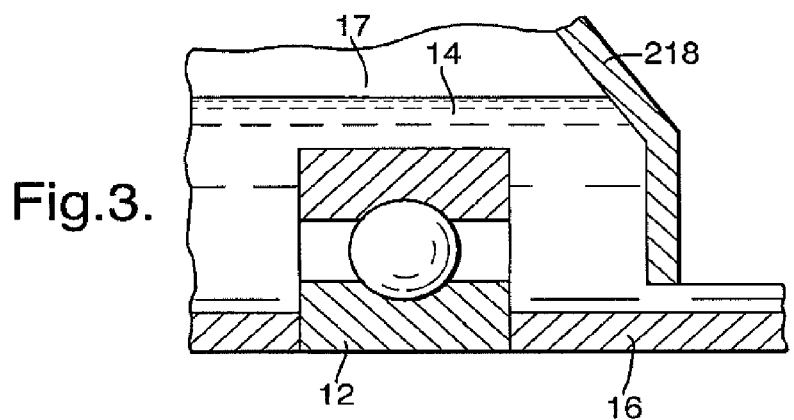
FIG. 3 is a diagrammatic view of a baffle within the chamber.

Referring to FIG. 3, there is shown a region of the space 17 defined by the chamber wall 16 in which a fluid calming member in the form of a baffle 218 is provided. The baffle 218, being formed of a porous metallic material is provided to reduce the velocity of fluid 14 striking the baffle 218. The porous nature of the baffle 218 inhibits splashing of the fluid 14 on striking the baffle 218. This has the advantage in this embodiment of improving the efficiency as compared to prior art fluid chambers. Thus the fluid 14 flowing through the space 17 remains in a calm state.

Figure 4:
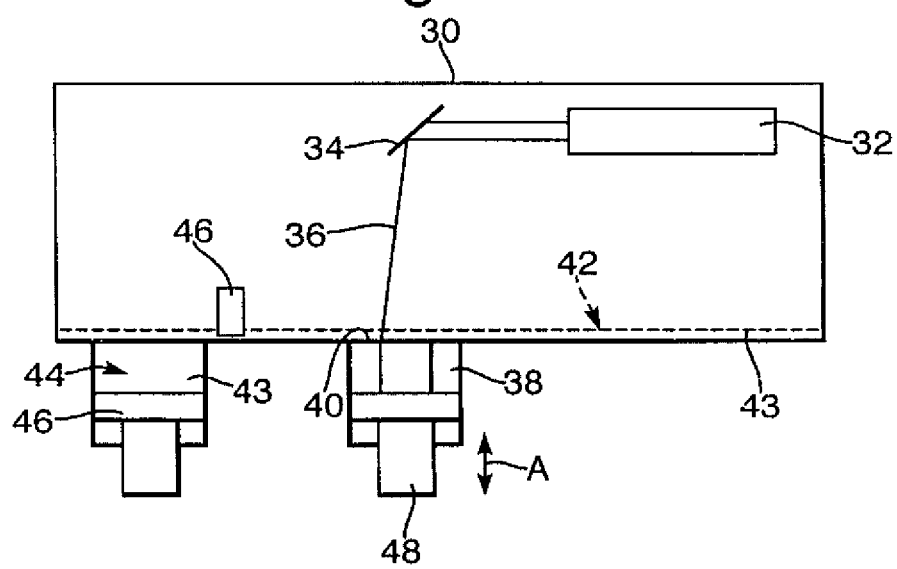
FIG. 4 is a diagrammatic view showing a first method of forming a fluid calming device.

Referring to FIG. 4, there is shown a first embodiment of a method of forming a fluid calming member.

The method comprises providing a manufacturing compartment 30 within which a laser or electron beam device 32 is provided. A mirror 34 acts to control a beam 36 of laser light or electrons. A work piece 38 is provided beneath the manufacturing compartment 30 such that the upper portion 40 thereof extends in to the manufacturing compartment 30. A film 42 of a titanium powder 43 is provided within the manufacturing compartment 30 and covers the work piece 38. A supply 44 of the powder 43 is provided in which a piston 46 can deliver the powder 43 into the manufacturing compartment 30. The film 42 of the powder 43 is levelled by a levelling device 46. In operation, the vertical position of the work piece 38 is controlled by a height control device 48 which can move up and down as shown by the arrows A.

The laser or electron beam device 32 transmits a beam of electrons or laser light at the film 42 of the metallic powder covering the work piece 38 to sinter the metallic power 42 in a layer on the work piece 38. After a layer has been formed, the height control device 48 moves the work piece downwardly and further powder 42 is then provided over the work piece 38, and the electron beam device is actuated to produce a further layer of the material on the work piece 38. This process is repeated until the fluid calming member has been fully formed from the work piece.

The laser/electron beam device 32 is controlled by an appropriate computer controlled system as would be understood by those skilled in the art.

Figure 5:
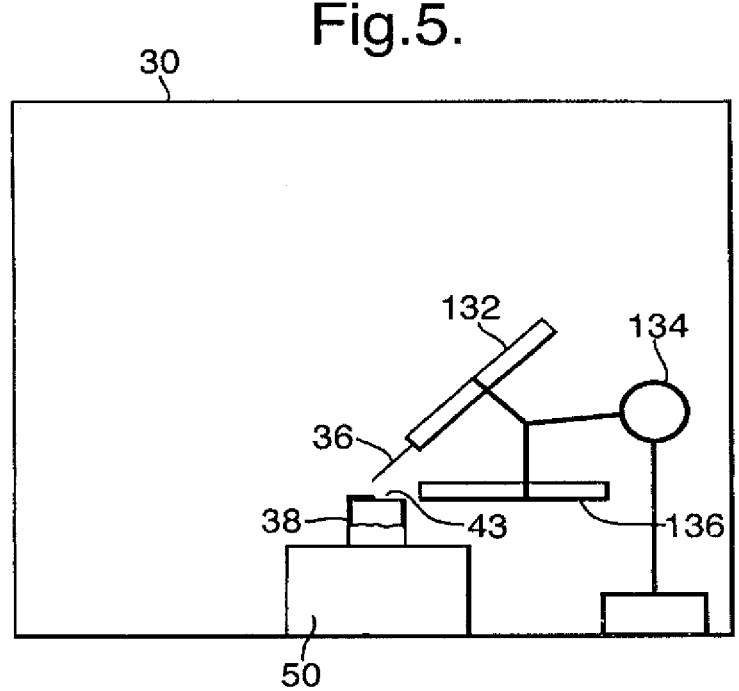
FIG. 5 is a diagrammatic view of a second method for forming a fluid calming device.

In the embodiment shown in FIG. 5, many of the features shown in FIG. 4 are present, and these have been designated with the same reference numerals as in FIG. 4. The embodiment shown in FIG. 5 comprises a support platform 50 on which the work piece 38 is provided. A further laser or electron beam device 132 is provided and supported by a positioning and scanning device 134. A powder dispenser 136 is also supported by the positioning and scanning device 134. The powder dispenser 136 dispenses a layer of the powder 43 onto the work piece 38 for formation into a layer of the work piece 38.

The positioning and scanning device 134 positions the laser or electron beam device 132 to transmit a beam of laser light or electrons at the work piece after the powder dispenser has dispensed a layer of powder on to the work piece.

After each time that the laser or electron beam device has transmitted the beam of laser light or electron to sinter the metallic powder 43 to form a further layer of the work piece 38, a further layer of powder 43 is dispensed by the powder dispenser 136 onto the work piece 38. This is repeated until the work piece 38 is fully formed.

When the fluid calming member has been fully formed, it is then arranged within the chamber 10 to provide a wall member, baffle or shroud as described above.

Various modifications can be made without departing from the scope of the invention.

For example, although in the embodiments described titanium powder is referred to, it will be appreciated that any suitable material could be employed instead.

I claim:

1. A bearing arrangement comprising:
   a bearing housing;
   a rolling-element bearing within the bearing housing, the rolling-element bearing having a plurality of individual roller elements; and
   a fluid calming member substantially surrounding the bearing and mounted to an inner wall of the bearing housing via a mounting structure, the mounting structure passing through the fluid calming member and the inner wall of the bearing housing to secure the fluid calming member to the inner wall,
   the fluid calming member being formed of a porous metallic material, and
   the fluid calming member being arranged to reduce the velocity of oil striking the fluid calming member and thereby inhibit splashing of oil within the bearing housing.

2. A bearing arrangement according to claim 1, wherein the fluid calming member is formed of a sintered metallic material.

3. A bearing arrangement according to claim 1, wherein the fluid calming member is formed of a metal foam material.

4. A bearing arrangement according to claim 1, wherein the porous metallic material includes titanium.

5. A bearing arrangement according to claim 1, wherein the fluid calming member includes substantially non-porous regions to allow the fluid calming member to be secured to the inner wall of the bearing housing via the mounting structure.

6. A bearing arrangement according to claim 5, and further comprising:
   lug portions disposed on the inner wall of the bearing housing at which the fluid calming member can be secured, the lug portions being arranged on the inner wall to be in register with the substantially non-porous regions when the fluid calming member is secured to the inner wall via the mounting structure.

7. A bearing arrangement according to claim 6, wherein the mounting structure includes a countersunk bolt, and the substantially non-porous regions each include a countersunk aperture for receiving the countersunk bolt.

8. A bearing arrangement according to claim 7, wherein the lugs each include a threaded recess for threadably receiving the countersunk bolt.

* * * * *